(12) United States Patent
Omura et al.

(10) Patent No.: US 7,248,460 B2
(45) Date of Patent: Jul. 24, 2007

(54) ELECTRIC DOUBLE LAYER CAPACITOR AND ELECTROLYTIC CELL

(75) Inventors: Seiji Omura, Daito (JP); Yasuhiro Kishimoto, Tokyo (JP); Mamoru Kimoto, Hirakata (JP); Kikuko Kato, Hirakata (JP); Hiroshi Nakajima, Hirakata (JP)

(73) Assignee: Sanyo Electric Co., Ltd., Moriguchi-Shi (JP)

( * ) Notice: Subject to any disclaimer, the term of this patent is extended or adjusted under 35 U.S.C. 154(b) by 0 days.

(21) Appl. No.: 10/558,484

(22) PCT Filed: May 27, 2004

(86) PCT No.: PCT/JP2004/007680

§ 371 (c)(1),
(2), (4) Date: Nov. 28, 2005

(87) PCT Pub. No.: WO2004/107373

PCT Pub. Date: Dec. 9, 2004

(65) Prior Publication Data

US 2007/0014076 A1    Jan. 18, 2007

(30) Foreign Application Priority Data

May 30, 2003  (JP) .............................. 2003-153728
May 30, 2003  (JP) .............................. 2003-153733
Jun. 27, 2003  (JP) .............................. 2003-184126
Jul. 4, 2003   (JP) .............................. 2003-191652

(51) Int. Cl.
*H01G 9/00* (2006.01)
(52) U.S. Cl. ..................................... 361/502; 361/503
(58) Field of Classification Search ......... 361/502–503
See application file for complete search history.

(56) References Cited

U.S. PATENT DOCUMENTS

2001/0012193 A1*  8/2001  Watanabe et al. ........... 361/502

FOREIGN PATENT DOCUMENTS

| JP | 3-3219 | 1/1991 |
|----|--------|--------|
| JP | 11-345599 | 12/1999 |
| JP | 2000-182903 | 6/2000 |
| JP | 2001-148234 | 5/2001 |
| JP | 2001-216952 | 8/2001 |

* cited by examiner

*Primary Examiner*—Eric W. Thomas
(74) *Attorney, Agent, or Firm*—Armstrong, Kratz, Quintos, Hanson, & Brooks, LLP.

(57) ABSTRACT

An electric double layer capacitor includes: a cell which includes a pair of polarizable electrodes impregnated with an electrolytic solution and disposed in opposed relation with a separator interposed therebetween; collector electrodes respectively attached to the polarizable electrodes; and a sealing member of a synthetic resin which seals a periphery of the cell. The collector electrodes extend outward of the sealing member through the sealing member in contact with the sealing member. The collector electrodes each have a rough surface portion which extends through the sealing member.

8 Claims, 10 Drawing Sheets

ELECTRIC DOUBLE LAYER CAPACITOR AND ELECTROLYTIC CELL

TECHNICAL FIELD

The present invention relates to an electric double layer capacitor and an electrolytic battery.

BACKGROUND ART

Electric double layer capacitors are generally excellent in charge-discharge characteristics.

FIG. 17 is a sectional view of a cell 2 of a conventional electric double layer capacitor 1 (see Japanese Unexamined Patent Publication No. 2001-351833). The cell includes a pair of polarizable electrodes 20, 21 stacked with the intervention of a separator 6, and collector electrodes 3, 30 of a metal are respectively attached to outer sides of the polarizable electrodes 20, 21. The polarizable electrodes 20, 21 are prepared by adding an electrically conductive polymer such as polypyrrole to powdery or fibrous active carbon, and compacting and press-molding the active carbon together with a binder. The polarizable electrodes 20, 21 are each impregnated with an electrolytic solution such as of sulfuric acid. Not only an aqueous solution such as the sulfuric acid solution but also a nonaqueous solution to be described later is usable as the electrolytic solution.

Peripheral portions of the polarizable electrodes 20, 21 are sealed with an insulative sealing member 4 of a synthetic resin. The sealing member 4 prevents the electrolytic solution from leaking out of the cell 2. In general, one or more such cells 2 are arranged laterally to constitute the electric double layer capacitor 1.

When the cell is charged, a DC voltage is applied between the collector electrodes with one of the collector electrodes 3 being connected to a positive terminal of a power source and with the other collector electrode 30 being connected to a negative terminal of the power source. Anions are attracted to the polarizable electrode 20 connected to the positive collector electrode 3, and cations are attracted to the polarizable electrode 21 connected to the negative collector electrode 30. Thus, an electric double layer structure is formed by the polarizable electrodes 3, 30.

When the cell is discharged, the collector electrodes 3, 30 are electrically connected to each other. Thus, electric charges accumulated in the polarizable electrodes 20, 21 are discharged.

In the electric double layer capacitor, however, the adhesion between the collector electrodes 3, 30 and the sealing member 4 is poor. Therefore, the electrolytic solution impregnated in the polarizable electrodes 20, 21 is liable to leak from gaps between the collector electrodes 3, 30 and the sealing member 4, or moisture is liable to intrude into the inside of the sealing member 4 from the outside of the cell 2.

Particularly, the nonaqueous electrolytic solution is liable to be electrolyzed in the cell 2 due to the intrusion of the moisture from the outside, thereby deteriorating the characteristic properties of the electric double layer capacitor.

It is an object of the present invention to provide an electric double layer capacitor and an electrolytic battery which are free from the leakage of the electrolytic solution and the intrusion of the moisture from the outside.

SUMMARY OF THE INVENTION

An electric double layer capacitor 1 comprises: a cell 2 which includes a pair of polarizable electrodes 20, 21 impregnated with an electrolytic solution and disposed in opposed relation with a separator 6 interposed therebetween; collector electrodes 3, 30 respectively attached to the polarizable electrodes 20, 21; and a sealing member 4 of a synthetic resin which seals a periphery of the cell 2.

The collector electrodes 3, 30 extend outward of the sealing member 4 through the sealing member 4 in contact with the sealing member 4.

The collector electrodes 3, 30 each have a rough surface portion 32 which extends through the sealing member 4.

The rough surface portion 32 has a step 34 bent in the sealing member 4.

BEST MODE FOR CARRYING OUT THE INVENTION

Embodiments of the present invention will hereinafter be described in detail with reference to the attached drawings.

Aqueous and Nonaqueous Electric Double Layer Capacitors

FIRST EMBODIMENT

Figure 1:
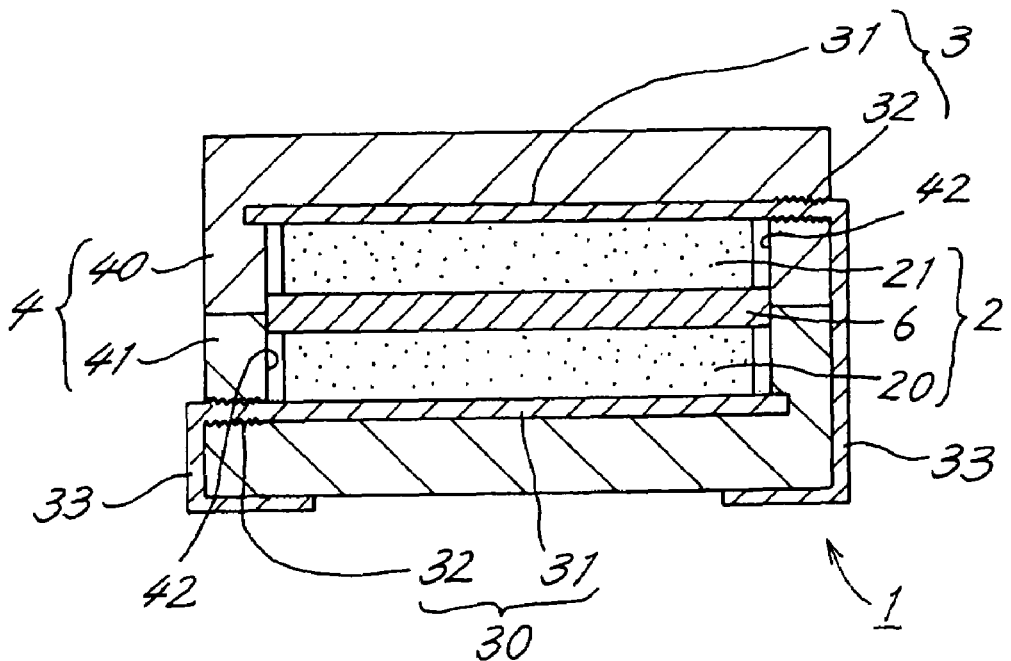
FIG. 1 is a sectional view of an electric double layer capacitor.

FIG. 1 is a sectional view of an electric double layer capacitor 1 according to this embodiment. Like the conventional cell, a cell 2 includes a pair of polarizable electrodes 20, 21 stacked with the intervention of a separator 6, and collector electrodes 3, 30 are respectively attached to outer sides of the polarizable electrodes 20, 21. The collector electrodes 3, 30 are metal plates of stainless steel, tungsten, aluminum or the like. In the following explanation, the upper polarizable electrode 21 is defined as a negative electrode, and the upper polarizable electrode 20 is defined as a positive electrode.

A sealing member 4 includes first and second half bodies 40, 41 of a rectangular prism shape each having a recess 42 formed in a center portion thereof and vertically stacked with the recesses 42, 42 thereof combined with each other. The polarizable electrodes 20, 21 and the separator 6 are provided in the recesses 42, 42. The collector electrodes 3, 30 respectively extend outward through the corresponding half bodies 40, 41, and are bent along the side faces and the lower surface of the sealing member 4.

The polarizable electrodes 20, 21 are each composed of powdery or fibrous active carbon, or a carbon nanomaterial such as fullerene or carbon nanotube.

The first half body 40 and the second half body 41 are each formed of glass, ceramic or a synthetic insulative resin. Examples of the insulative resin include a modified polyamide, a nylon resin, polyethylene terephthalate, polypropylene and polyphenylene sulfide.

Examples of the electrolytic solution to be impregnated in the polarizable electrodes 20, 21 include aqueous electrolytic solutions such as a sulfuric acid solution and a potassium hydroxide solution, and nonaqueous electrolytic solutions such as of triethylmethylammonium tetrafluoroborate ($Et_3MeNBF_4$) and tetraethylammonium tetrafluoroborate ($Et_4NBF_4$) dissolved in aprotic organic solvents. Examples of the aprotic organic solvents include bifunctional solvents such as carbonates, lactones, nitrites, amides, nitroalkanes, sulfones, sulfoxides, phosphates, dinitriles and ethernitriles.

Usable as the separator 6 are nonwoven glass fabrics, pulp fabrics and films formed of insulative resins such as polytetrafluoroethylene (PTFE).

The negative collector electrode 3 includes a horizontal portion 31 contacting the polarizable electrode 21, a rough surface portion 32 connected to the horizontal portion 31 and extending through the first half body 40, and an exposed portion 33 bent from the rough surface portion 32 along the first half body 40 and the second half body 41. The rough surface portion 32 intimately contacts the first half body 40.

Like the negative collector electrode 3, the positive collector electrode 30 includes a horizontal portion 31, a rough surface potion 32 connected to the horizontal portion 31 and extending through the second half body 41, and an exposed potion 33. The rough surface portions 32 are each formed by a surface roughening treatment, and have an average roughness of not smaller than 0.3 µm along a center line thereof. The surface roughening treatment may be achieved by etching, sandblasting, knurl, sand paper or the like.

The provision of the rough surface portions 32 which extend through the sealing member 4 increases the adhesion between the sealing member 4 and the collector electrodes 3, 30. Further, contact surface areas of the collector electrodes 3, 30 and the sealing member 4 are increased. This prevents the leakage of the electrolytic solution from the inside of the sealing member 4 and the intrusion of the moisture from the outside of the sealing member 4.

Figure 2:
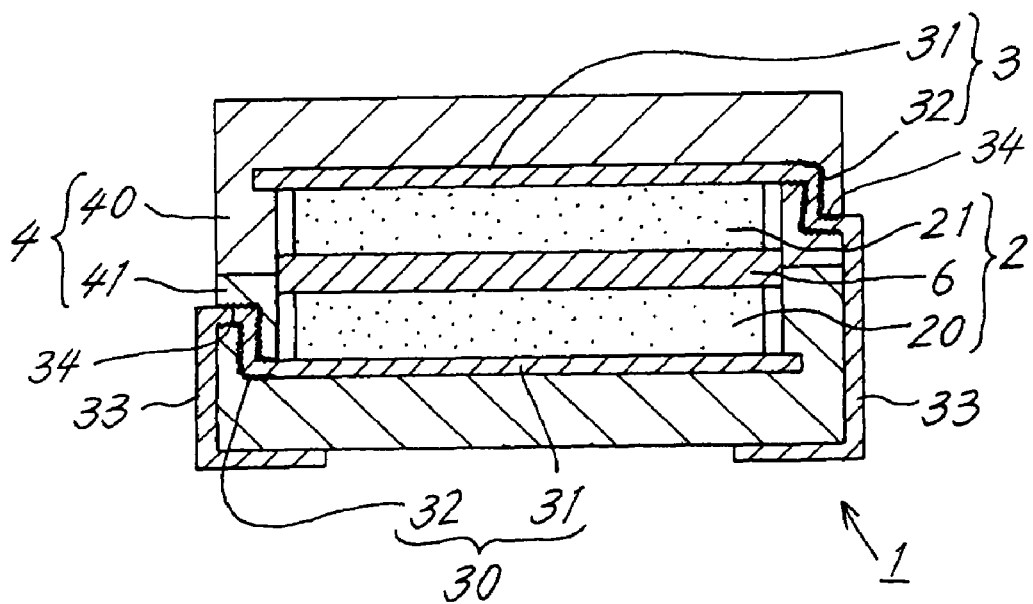
FIG. 2 is a sectional view of an electric double layer capacitor having steps.

Another conceivable arrangement for effectively preventing the leakage of the electrolytic solution and the intrusion of the moisture form the outside of the cell 2 is shown in FIG. 2. In this arrangement, the rough surface portions 32 each have a step 34 bent as having two stages.

With the provision of the steps 34, the rough surface portions 32 each have an increased length as compared with the straight rough surface portions 32. Thus, the length of a path along which the moisture intrudes into the cell 2 from the outside of the sealing member 4, if any, is increased, so that the leakage of the electrolytic solution and the intrusion of the moisture from the outside are further assuredly prevented. Where the rough surface portions 32 are bent, the collector electrodes 3, 30 are prevented from displacing in the first half body 40 and the second half body 41 when the collector electrodes 3, 30 are bent along the outer surfaces of the sealing member 4. This stabilizes the characteristic properties of the electric double layer capacitor 1, and improves the yield of the electric double layer capacitor 1.

Production Method for Electric Double Layer Capacitor

Figure 3:
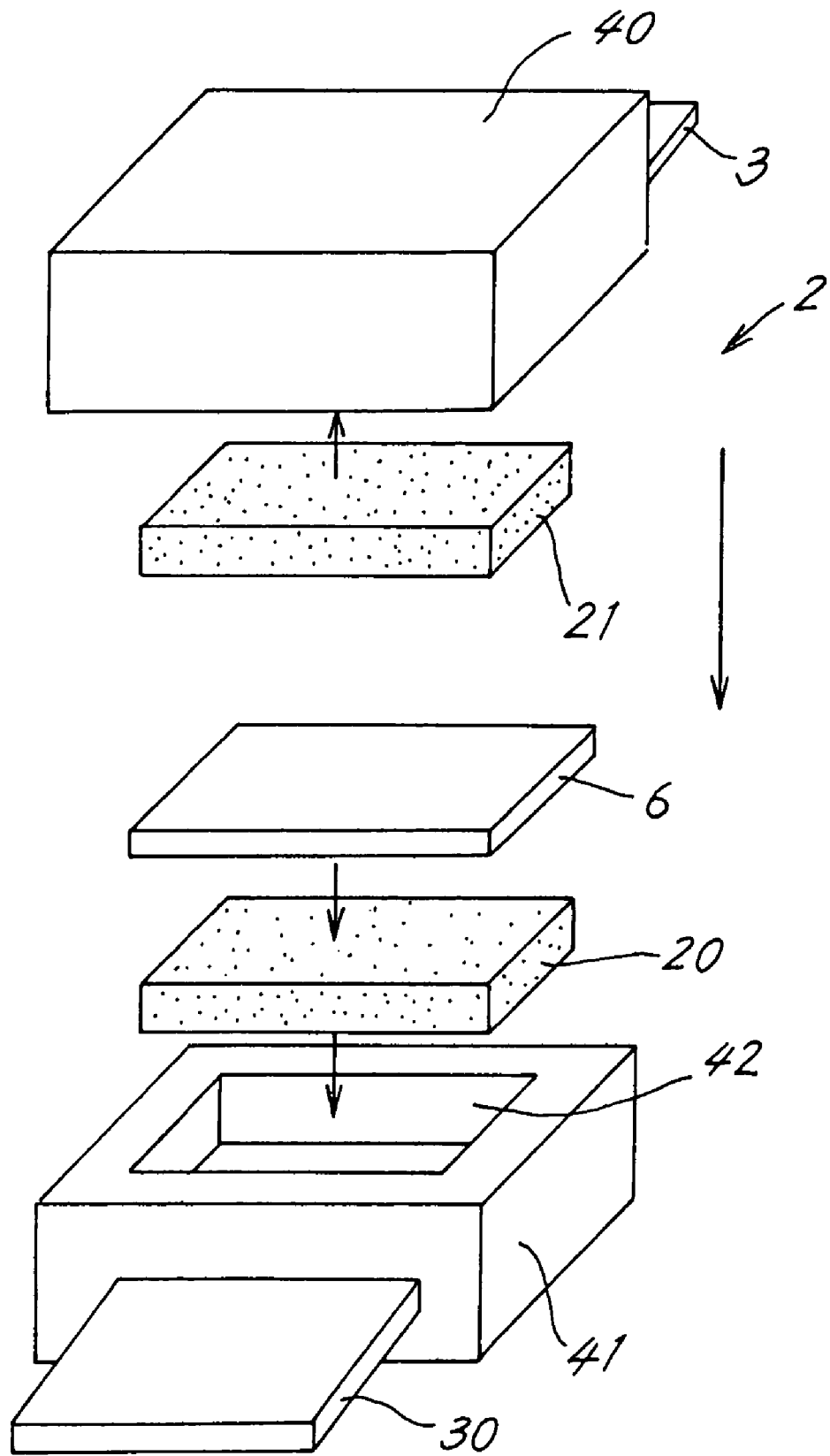
FIG. 3 is an exploded perspective view illustrating a production method for an electric double layer capacitor.

The cell 2 of the electric double layer capacitor 1 shown in FIG. 1 is constructed as illustrated in FIG. 3. The first half body 40 is prepared by insert-molding with the negative collector electrode 3 inserted therein. The recess (not shown) of the first half body 40 opens downward. Similarly, the second half body 41 is prepared by insert-molding with the positive collection electrode 30 inserted therein. The recess 42 of the second half body 41 opens upward.

The pair of polarizable electrodes 20, 21 are disposed in the recesses 42 of the half bodies 40, 41 with the separator 6 interposed therebetween. The separator 6 and the polarizable electrodes 20, 21 are preliminarily impregnated with the electrolytic solution by vacuum filling. After the half bodies 40, 41 are combined with each other, the peripheral edges of the half bodies 40, 41 are bonded to each other by ultrasonic welding or the like. Thereafter, the exposed portions 33 of the collector electrodes 3, 30 are bent downward along the peripheral surfaces of the half bodies 40, 41. Thus, the electric double layer capacitor 1 shown in FIG. 1 is completed.

SECOND EMBODIMENT

Figure 4:
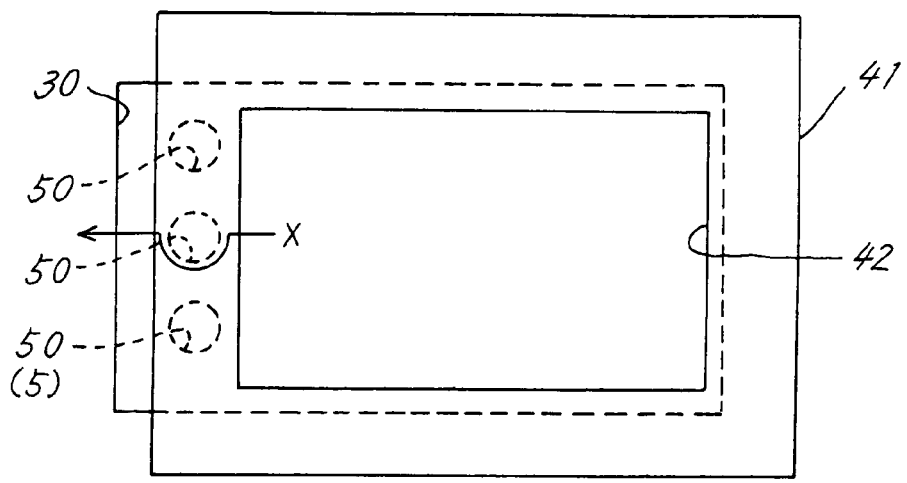
FIG. 4 is a plan view of a collector electrode and a second half body.

This embodiment is characterized in that the collector electrodes 3, 30 each have a resin filling portion 5. FIG. 4 is a plan view of the collector electrode 30 and the second half body 41 in this embodiment. More specifically, the collector electrode 30 has round openings 50, 50 formed therein as the resin filling portion 5 to be filled with a resin of the second half body 41. By filling the openings 50, 50 with the resin, the adhesion between the collector electrode 30 and the second half body 41 is increased. As indicated by an arrow X in FIG. 4, the length of a path along which the electrolytic solution flows out of the recesses 42 to the outside of the sealing member 4, if any, is increased because the electrolytic solution flows along the peripheral edges of the openings 50. This prevents the leakage of the electrolytic solution from the inside of the sealing member 4 and the intrusion of the moisture from the outside of the sealing member 4. Of course, the other collector electrode 3 may also have openings 50, 50.

Figure 6:
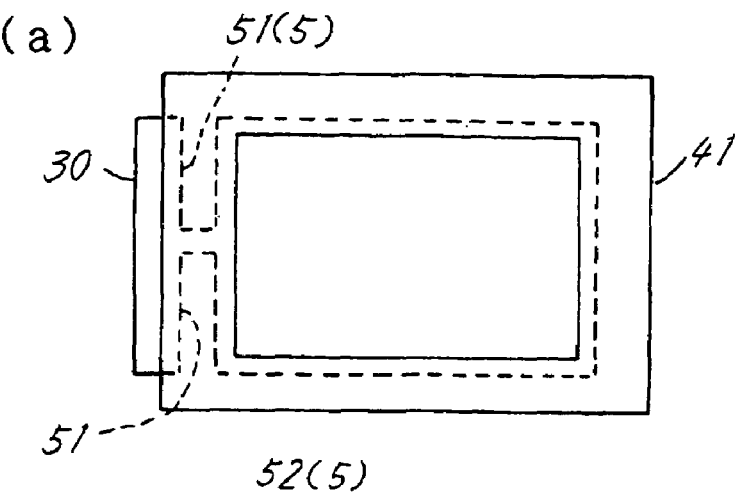
FIGS. 6(a) to 6(d) are plan views of collector electrodes and second half bodies.
Figure 6:
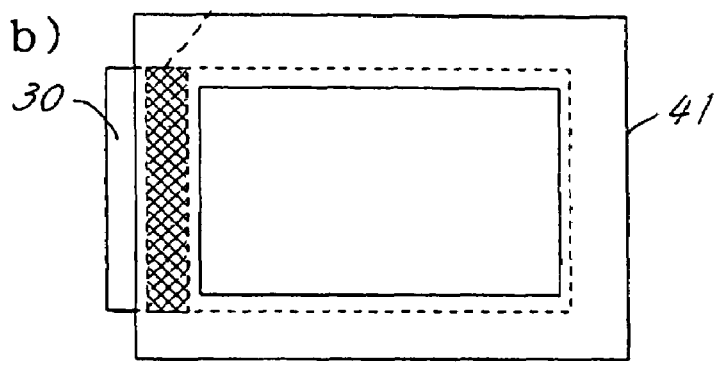
Figure 6:
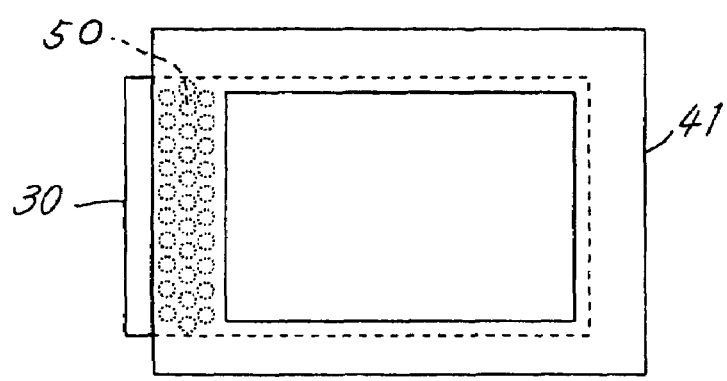
Figure 6:
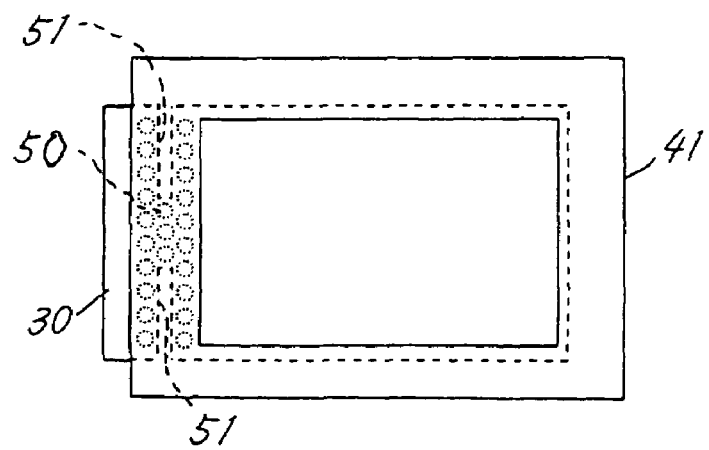

The resin filling portion 5 may be provided in the form of slits 51 or a mesh 52 formed in the collector electrode 30 as shown in FIGS. 6(a) to 6(c). The formation of the slits 51 and the mesh 52 may be achieved by stamping. As shown in FIG. 6(d), the resin filling portion 5 may have slits 51 and a mesh 52 in combination.

Figure 5:
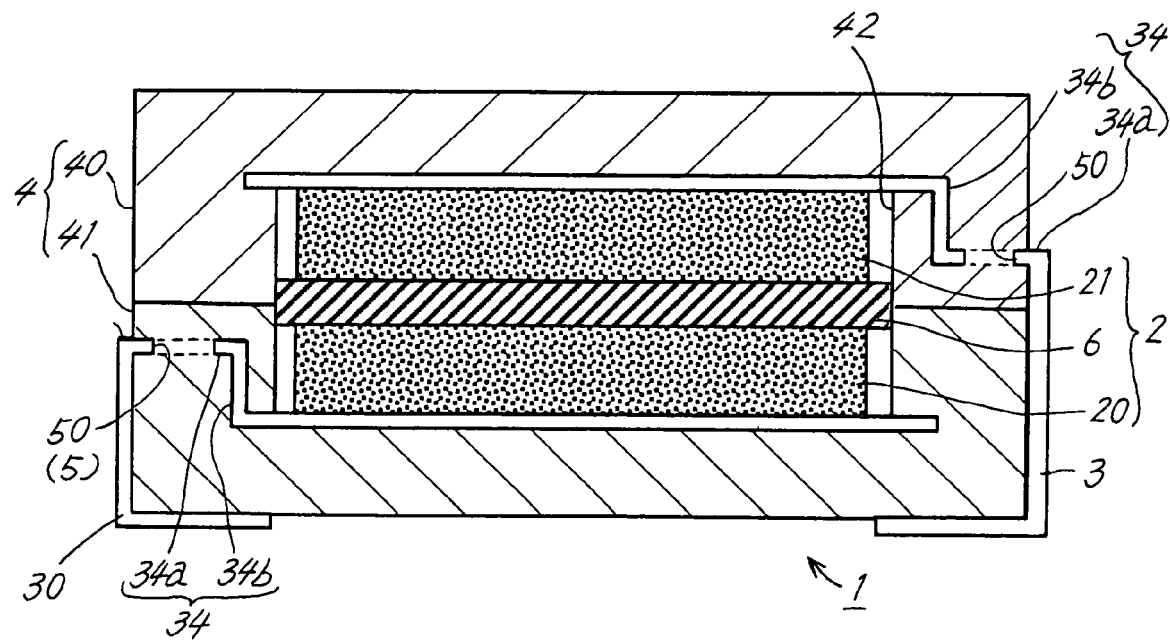
FIG. 5 is a sectional view of an electric double layer capacitor having steps.
Figure 7:
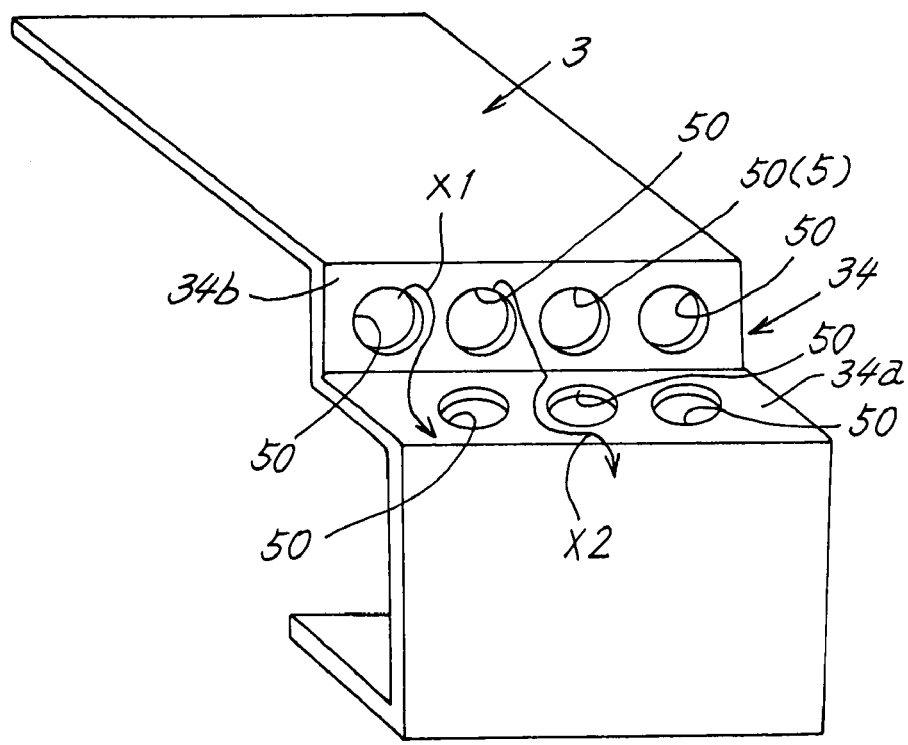
FIG. 7 is a perspective view of a collector electrode having openings.
Figure 8:
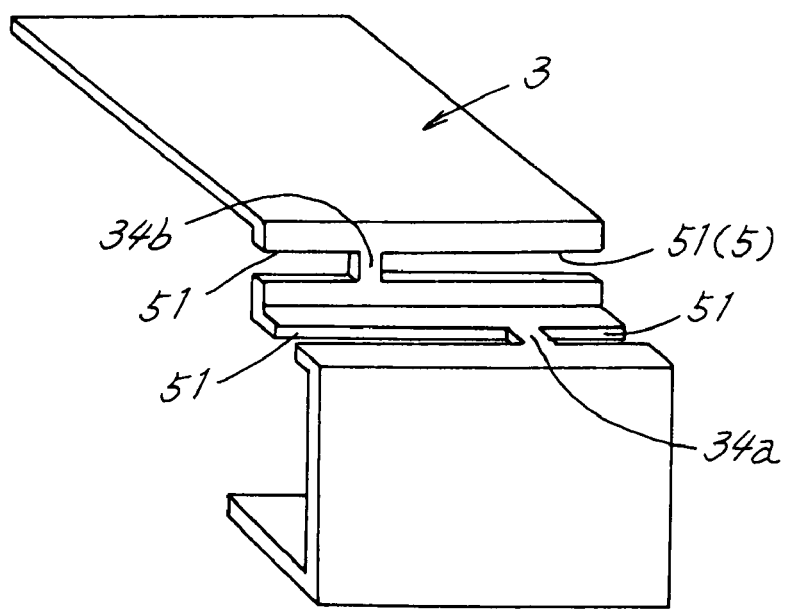
FIG. 8 is a perspective view of a collector electrode having slits.

Further, as shown in FIG. 5, the collector electrodes 3, 30 may each be bent into a two-stage step 34 which includes a horizontal plate portion 34a and a vertical plate portion 34b, and the resin filling portion 5 may be provided in the step 34. FIGS. 7 and 8 are perspective views of collector electrodes 3 each having such a step 34. The resin filling portion 5 may include openings 50 or slits 51.

In FIG. 7, openings 50 formed in the horizontal plate portion 34a of the step 34 and openings 50 formed in the vertical plate portion 34b are located in laterally staggered relation. More specifically, the openings 50 of the horizontal plate portion 34a are located below spaces between the openings 50, 50 of the vertical plate portion 34b. Thus, even if the electrolytic solution leaks from the peripheral edges of the openings 50 of the vertical plate portion 34b, the electrolytic solution flows along the peripheral edges of the openings 50 as indicated by an arrow X1 in FIG. 7. Even if the electrolytic solution leaks through the spaces between the openings 50, 50 of the vertical plate portion 34b as indicated by an arrow X2, the electrolytic solution flows along the peripheral edges of the openings 50 of the horizontal plate portion 34a. As a result, the length of a path along which the electrolytic solution flows out of the sealing member 4, if any, is increased, thereby preventing the leakage of the electrolytic solution and the intrusion of the moisture from the outside of the sealing member 4. Further, as shown in FIG. 8, slits 51 formed in the horizontal plate portion 34a and slits 51 formed in the vertical plate portion 34b may be located in laterally staggered relation.

Figure 9:
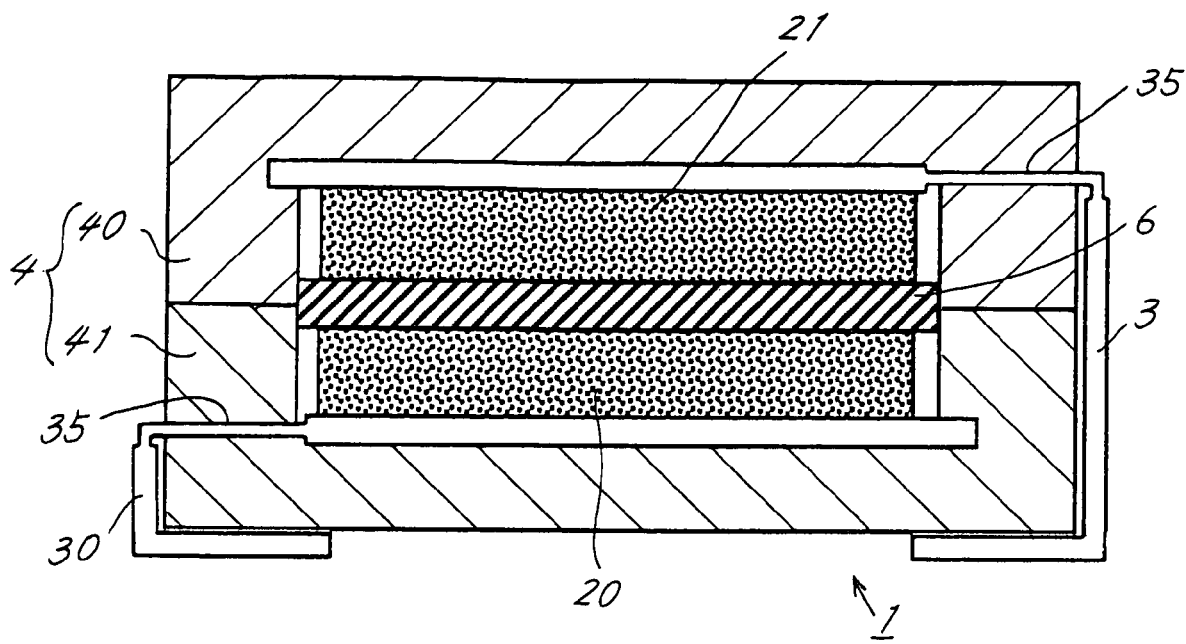
FIG. 9 is a sectional view of an electric double layer capacitor having small thickness portions.

Further, as shown in FIG. 9, the collector electrodes 3, 30 may each have a small thickness portion 35 having a thin cross section in contact with the half body 40, 41. In this case, a space above the small thickness portion 35 is filled with the resin of the sealing member 4, so that the small thickness portion 35 serves as the resin filling potion 5. With the provision of the small thickness portion 35, the contact surface areas of the collector electrodes 3, 30 and the sealing member 4 are reduced. This prevents the leakage of the electrolytic solution and the intrusion of the moisture from the outside of the sealing member 4.

THIRD EMBODIMENT

Figure 10:
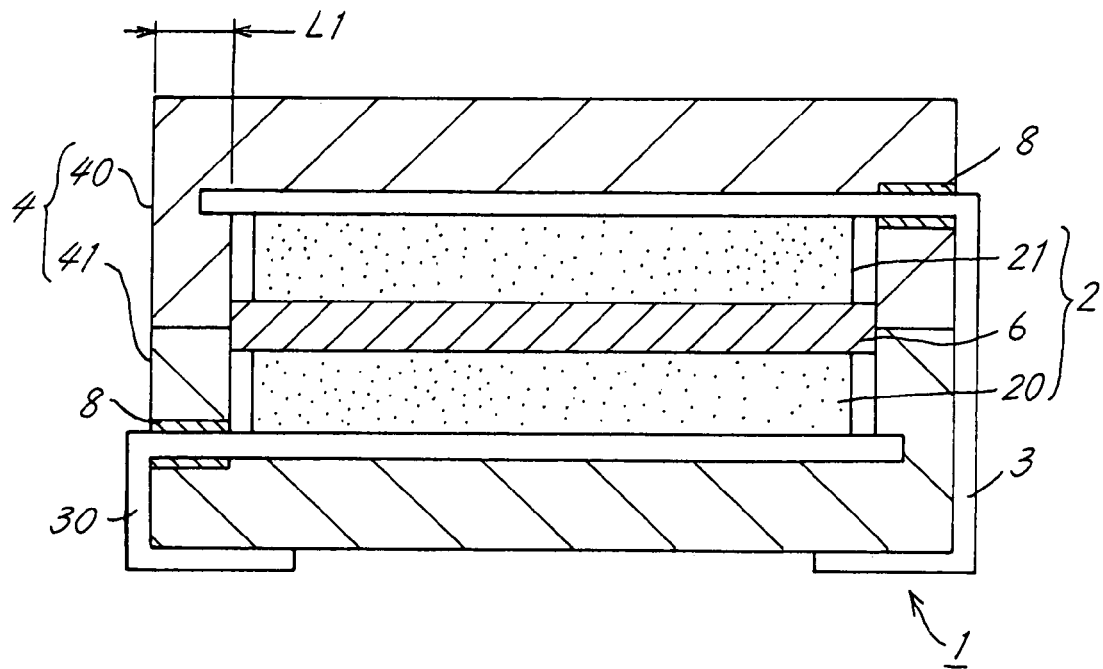
FIG. 10 is a sectional view of an electric double layer capacitor having resin layers.

This embodiment is characterized in that resin layers 8 are provided on the collector electrodes 3, 30, and the collector electrodes 3, 30 are bonded to the sealing member 4 with the intervention of the resin layers 8. FIG. 10 is a sectional view of an electric double layer capacitor 1 according to this embodiment. The resin layers 8 are composed of a material which is more adhesive to the collector electrodes 3, 30 than the material for the sealing member 4. More specifically, where the sealing member 4 is composed of a liquid crystal polymer or polypropylene, the resin layers 8 are composed of an epoxy resin. The provision of the resin layers 8 increases the adhesion between the collector electrodes 3, 30 and the sealing member 4. This prevents the leakage of the electrolytic solution from the inside of the sealing member 4 and the intrusion of the moisture from the outside of the sealing member 4.

As shown in FIGS. 13(a) to 13(d), the resin layers 8 protrude out of the sealing member 4 or into the recess 42. In order to ensure proper adhesion between the sealing member 4 and the collector electrodes 3, 30, the width of the resin layers 8 should be at least about 70% of the width L1 of portions of the collector electrodes 3, 30 contacting side portions of the sealing member 4.

The resin layers 8 preferably each have a thickness of not greater than 100 μm and not smaller than 1 μm. If the resin layers 8 are too thin or too thick, the strength of the bonding between the collector electrodes 3, 30 and the sealing member 4 is reduced. Further, where the resin layers 8 are composed of a resin having a higher water absorption factor than the resin of the sealing member 4 and have an excessively great thickness, moisture in the resin layers 8 is liable to migrate into the sealing member 4. Therefore, the thickness of the resin layers 8 is specified as described above.

Production Method for Electric Double Layer Capacitor

The electric double layer capacitor 1 according to this embodiment is produced in the following manner.

Figure 11:
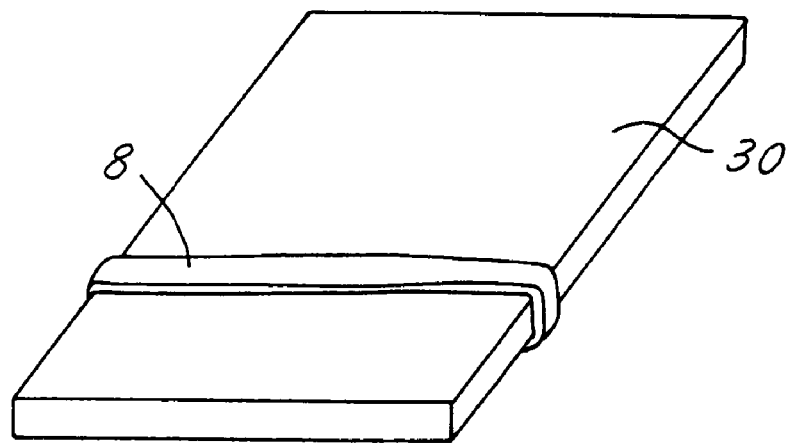
FIG. 11 is a perspective view of a collector electrode formed with a resin layer.
Figure 12:
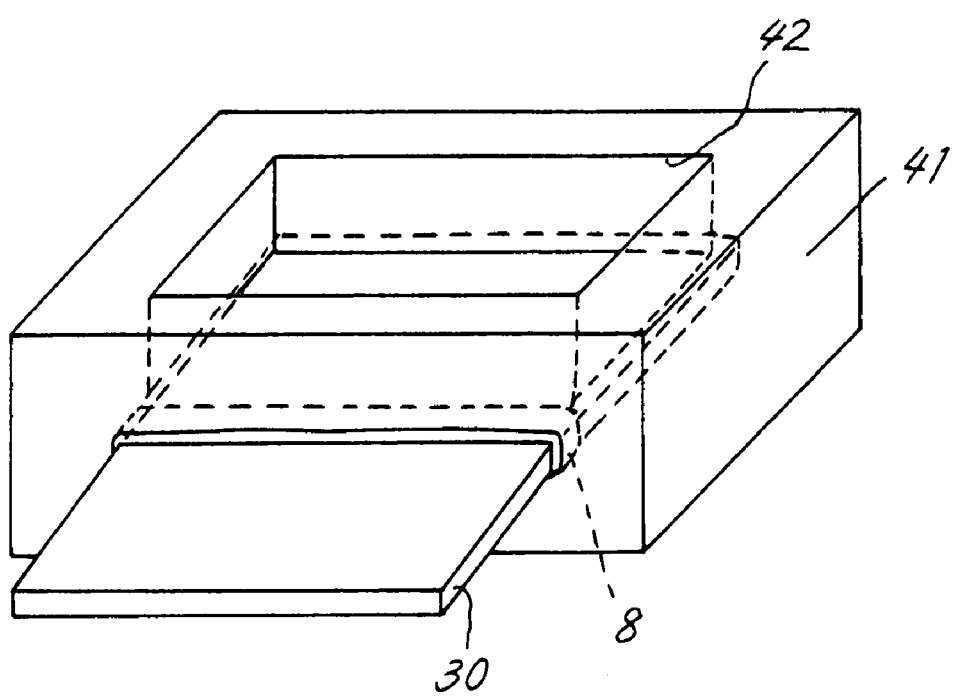
FIG. 12 is a perspective view of a second half body employing the collector electrode formed with the resin layer.
Figure 13:
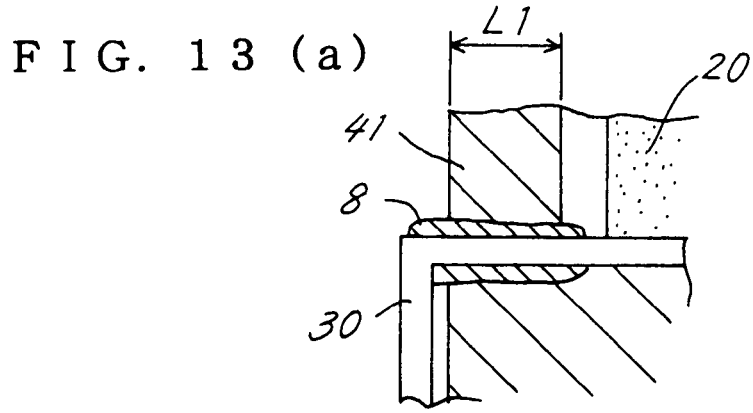
FIGS. 13(a) to 13(d) are sectional views of various examples of the resin layer.
Figure 13:
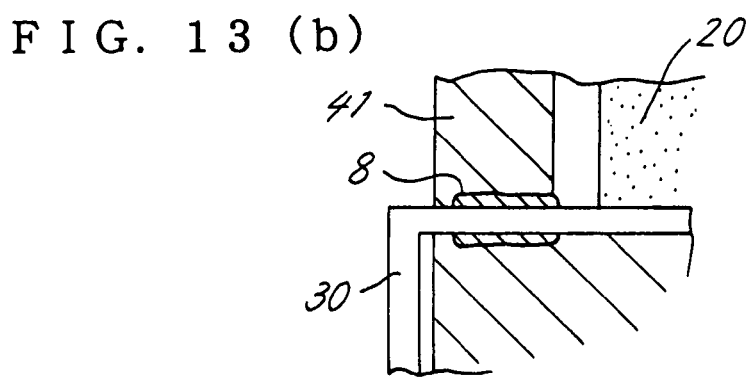
Figure 13:
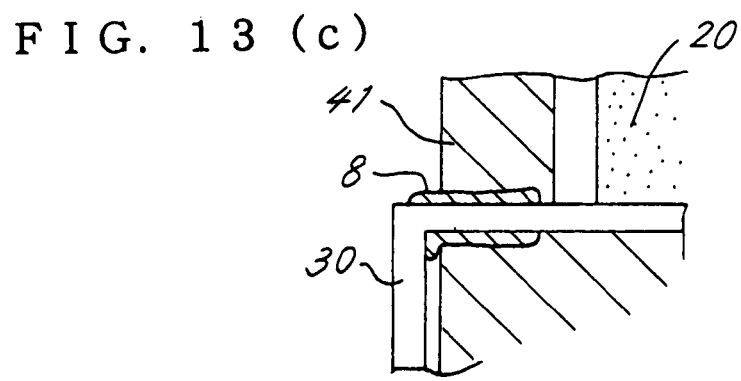
Figure 13:
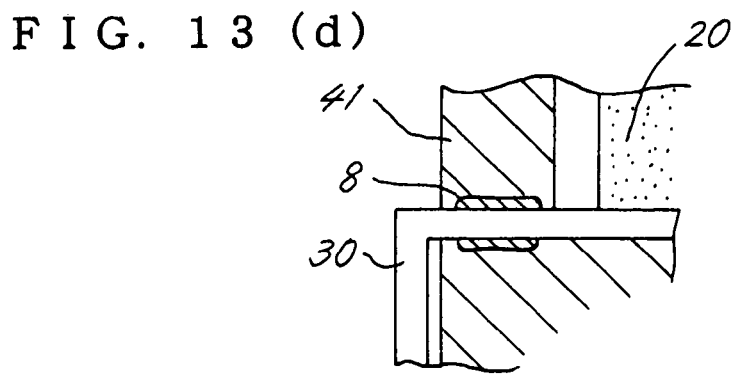
Figure 14:
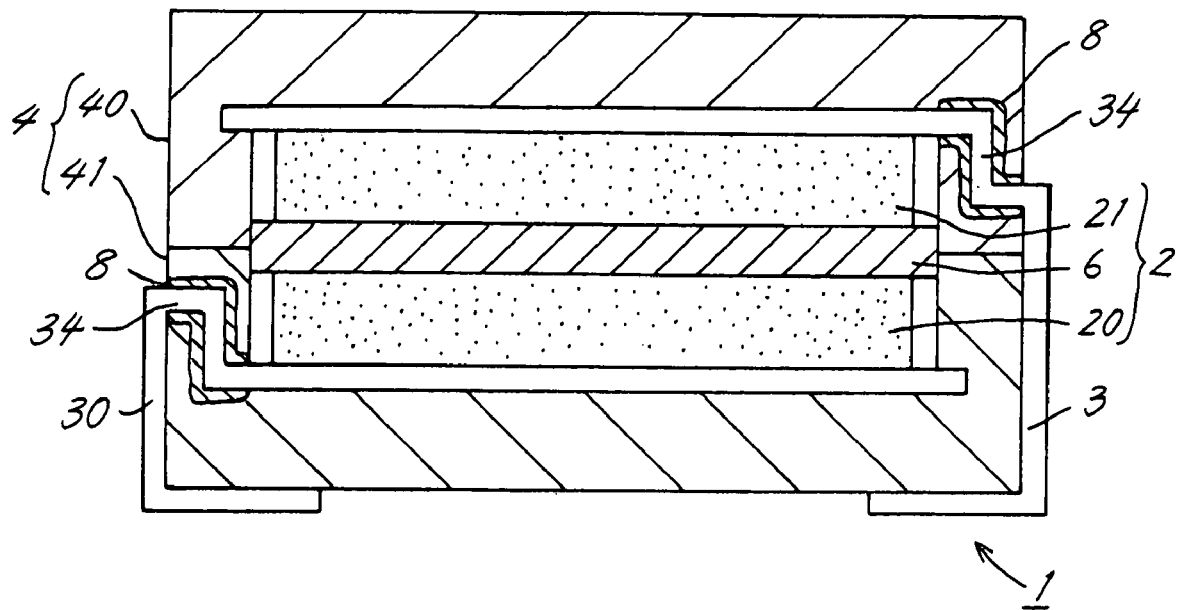
FIG. 14 is a sectional view of an electric double layer capacitor having steps each formed with a resin layer.

As shown in FIG. 11, a liquid epoxy resin is applied transversely of the collector electrode 30 on front and back surfaces of the collector electrode 30 for formation of the resin layer 8. After the epoxy resin is dried, the second half body 41 is prepared by insert-molding with the collector electrode 30 inserted therein as shown in FIG. 12. The resin layer 8 is positioned in a side portion of the second half body 41. The first half body 40 is prepared in the same manner as described above. The separator 6 and the polarizable electrodes 20, 21 are placed in the half bodies 40, 41, which are combined with each other. Thus, the electric double layer capacitor 1 is produced. As shown in FIG. 14, portions of the collector electrodes 3, 30 to be embedded in the side portions of the sealing member 4 may be each formed with the steps 34, and the resin layers 8 may be formed on the steps 34.

Figure 15:
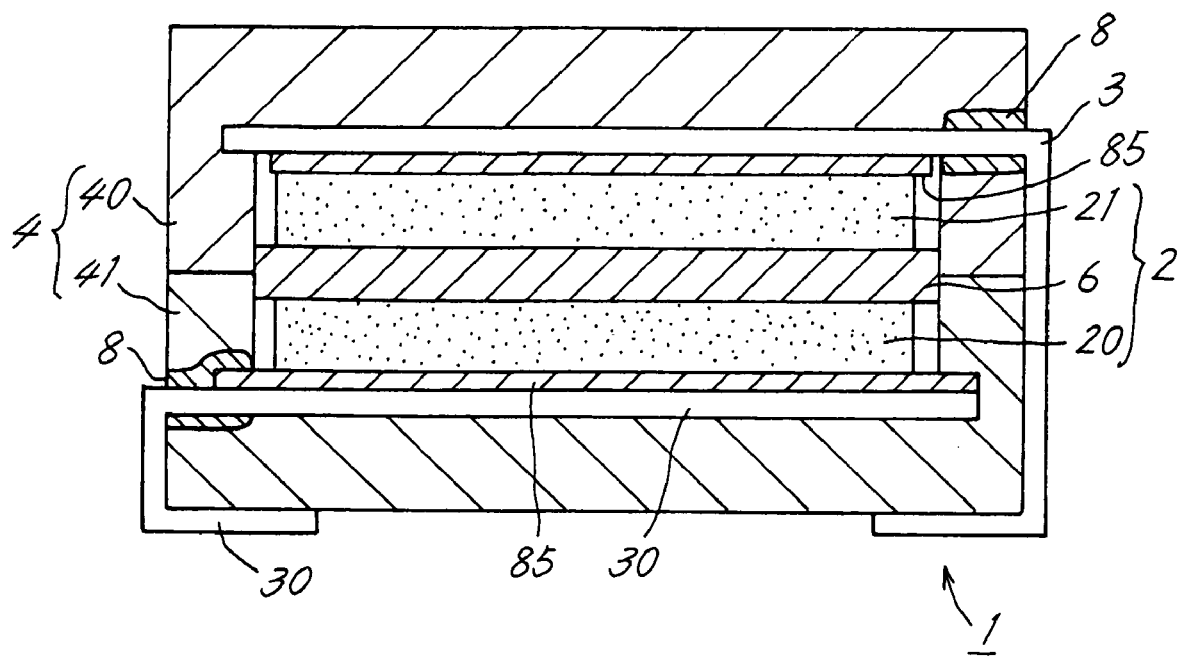
FIG. 15 is a sectional view of an electric double layer capacitor including current collectors.

Further, as shown in FIG. 15, current collectors 85, 85 may be respectively provided between the polarizable electrodes 20, 21 and the corresponding collector electrodes 30, 3. The resin layers 8 are provided on the portions of the collector electrodes 30, 3 to be embedded in the side portions of the sealing member 4. The current collectors 85, 85 are composed of a metal different from the material for the collector electrodes 3, 30. More specifically, the collector electrodes 3, 30 are composed of copper or nickel, while the current collectors 85, 85 are composed of stainless steel, aluminum, tungsten or the like. The current collectors 85, 85 are formed by applying metal foils on the collector electrodes 3, 30 or plasma-spraying the current collector material on the collector electrodes 3, 30.

Aqueous or Nonaqueous Electrolytic Battery

The present invention is applicable to an aqueous or nonaqueous electrolytic battery.

The electrolytic battery has substantially the same construction and is produced in substantially the same manner as the electric double layer capacitor, except that some of its components are composed of different materials.

In the case of the nonaqueous electrolytic battery, the polarizable electrodes of the electric double layer capacitor are replaced with a positive active material member and a negative active material member. The positive active material member is prepared by press-molding or sintering powder of lithium cobaltate, lithium manganate, lithium nickelate or the like. The negative active material member is prepared by press-molding or sintering powder of graphite carbon material or coke carbon material.

A solution of a lithium salt dissolved in an organic solvent is used as the electrolytic solution. Examples of the lithium salt include $LiBF_4$, $LiClO_4$, $LiPF_6$, $LiAsF_6$, $Li(CF_3O_2)_2N$ and $LiC_4F_9SO_3$. Examples of the organic solvent include propylene carbonate, γ-butyrolactone and a mixture of propylene carbonate or γ-butyrolactone and a chain carbonate. Examples of the chain carbonate include dimethyl carbonate (DMC, DEC) and ethyl methyl carbonate (EMC).

A porous polymer film such as of polyethylene, polypropylene or a like polyolefin is used as the separator. A positive collector electrode 30 is composed of aluminum or the like, and a negative collector electrode 3 is composed of copper.

In the case of the aqueous electrolytic battery such as a lithium ion battery, the positive active material member is prepared by sintering or compact-molding powder or a pellet of nickel oxide, and the negative active material member is prepared by sintering or compact-molding powder or a pellet of an Mm—Ni—Co—Mn—Al hydrogen-absorbing alloy (wherein Mm is a mixture of a rare earth element).

A solution of potassium hydroxide or a polymeric hydrogel electrolyte is used as the electrolytic solution. A porous polymer film such as of a sulfonated polypropylene is used as the separator.

Figure 16:
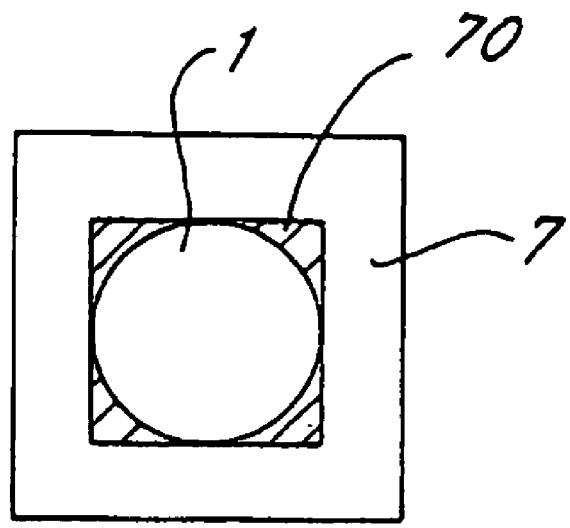
FIG. 16 is a plan view of a circuit board and an electric double layer capacitor.
Figure 17:
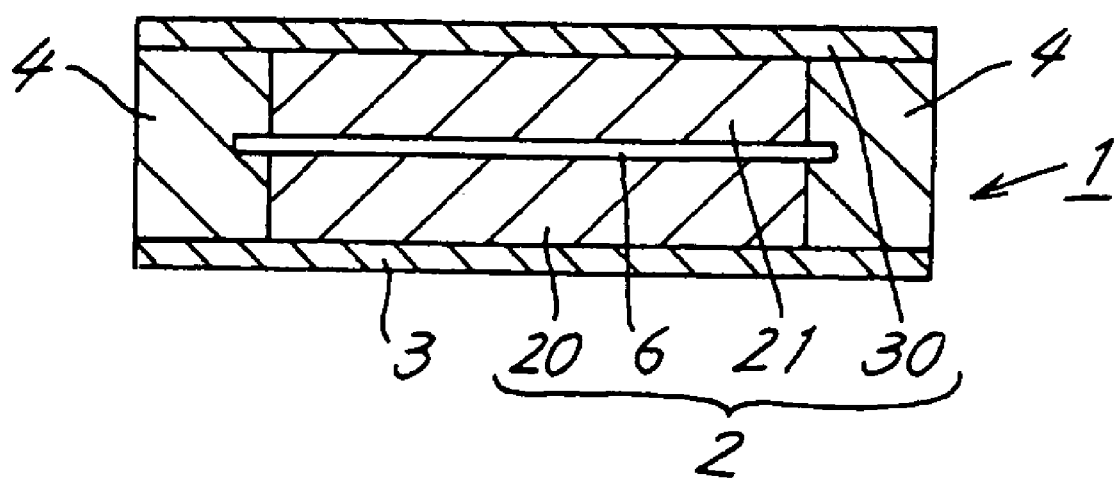
FIG. 17 is a sectional view of a conventional electric double layer capacitor.

In general, the electric double layer capacitor and the electrolytic battery each have a rectangular prism shape or a disk shape. However, where the electric double layer capacitor or the electrolytic battery having a disk shape is mounted on a circuit board 7 as indicated by hatching in FIG. 16, there is a dead space 70. Therefore, the rectangular prism shape is preferred for effective utilization of a surface area of the circuit board 7.

INDUSTRIAL APPLICABILITY

In the inventive electric double layer capacitor 1, the collector electrodes each have the rough surface portion 32 which extends through the sealing member 4. Therefore, the adhesion between the sealing member 4 and the collector electrodes 3, 30 is improved. Further, the contact surface areas of the sealing member 4 and the collector electrodes 3, 30 are increased. This prevents the leakage of the electrolytic solution from the inside of the sealing member 4 and the intrusion of the moisture from the outside of the sealing member 4.

Further, the rough surface portion 32 having the step 34 has an increased length as compared with the straight rough surface portion 32. Therefore, the length of the path along which the moisture intrudes into the cell 2 from the outside of the sealing member 4, if any, is increased, so that the leakage of the electrolytic solution and the intrusion of the moisture from the outside can be further assuredly prevented. Where the rough surface portions 32 are bent, the collector electrodes 3, 30 are prevented from displacing in the first half body 40 and the second half body 41 when the collector electrodes 3, 30 are bent along the outer surfaces of the sealing member 4. This stabilizes the characteristic properties of the electric double layer capacitor 1, and improves the yield of the electric double layer capacitor.

What is claimed is:

1. An electric double layer capacitor comprising:
   a cell which includes a pair of polarizable electrodes impregnated with an electrolytic solution and disposed in opposed relation with a separator interposed therebetween;
   collector electrodes respectively attached to the polarizable electrodes; and
   a sealing member of a synthetic resin which seals a periphery of the cell,
   wherein the the sealing member consists of two half bodies joined to each other, the half bodies being coupled integrally with the collector electrodes by burying a portion thereof,
   the collector electrodes extending outwardly from the cell through the half bodies in the opposite direction each other,
   wherein the collector electrodes each have a rough surface portion at a portion extending through the half bodies.

2. An electric double layer capacitor as set forth in claim 1,
   wherein the collector electrodes are bent and buried in the half bodies at the portion extending therefrom,
   the rough surface portion is formed all over length of the portion buried in the collector electrodes.

3. An electric double layer capacitor comprising:
   a cell which includes a pair of polarizable electrodes impregnated with an electrolytic solution and disposed in opposed relation with a separator interposed therebetween;
   collector electrodes respectively attached to the polarizable electrodes; and
   a sealing member of a synthetic resin which seals a periphery of the cell,
   wherein the sealing member consists of two half bodies joined to each other, the half bodies being coupled integrally with the collector electrodes by burying a portion thereof,
   the collector electrodes extending outwardly from the cell through the half bodies in the opposite direction each other,
   wherein the collector electrodes each have a resin filling portion located in the portion within the half bodies and filled with the resin of the half bodies.

4. An electric double layer capacitor as set forth in claim 3, wherein the collector electrodes each have a step bent in the sealing member.

5. An electric double layer capacitor as set forth in claim 3, wherein the resin filling portion has at least one of an opening, a slit, and a mesh.

6. An electric double layer capacitor comprising:
   a cell which includes a pair of polarizable electrodes impregnated with an electrolytic solution and disposed in opposed relation with a separator interposed therebetween;
   collector electrodes respectively attached to the polarizable electrodes; and
   a sealing member of a synthetic resin which seals a periphery of the cell,
   wherein the sealing member consists of two half bodies joined to each other, the half bodies being coupled integrally with the collector electrodes by burying a portion thereof,
   the collector electrodes extending outwardly from the cell through the half bodies in the opposite direction each other,
   wherein the buried portions of the collector electrodes in the half bodies are each provided with a resin layer, and collector electrodes are bonded to the half bodies with the intervention of the resin layer.

7. An electric double layer capacitor as set forth in claim 6, wherein current collectors are provided between the polarizable electrodes and the corresponding collector electrodes.

8. An electrolytic battery comprising:
   a cell which includes a pair of active material members impregnated with an electrolytic solution and disposed in opposed relation with a separator interposed therebetween;
   collector electrodes respectively attached to the active material members; and
   a sealing member of a synthetic resin which seals a periphery of the cell,
   wherein the sealing member consists of two half bodies joined to each other, the half bodies being coupled integrally with the collector electrodes by burying a portion thereof,
   the collector electrodes extending outwardly from the cell through the half bodies in the opposite direction each other,
   wherein the collector electrodes each have a rough surface portion at the portion of the collector electrodes buried in the half bodies.

* * * * *